(12) United States Patent
Kombowski et al.

(10) Patent No.: US 8,291,700 B2
(45) Date of Patent: Oct. 23, 2012

(54) DRIVE TRAIN COMPRISING A HYDRODYNAMIC TORQUE CONVERTER, AND HYDRODYNAMIC TORQUE CONVERTER

(75) Inventors: Eugen Kombowski, Buehl (DE); Stephan Maienschein, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/027,866

(22) Filed: Feb. 15, 2011

(65) Prior Publication Data

US 2011/0131965 A1   Jun. 9, 2011

Related U.S. Application Data

(63) Continuation of application No. PCT/DE2009/001135, filed on Aug. 6, 2009.

(30) Foreign Application Priority Data

Aug. 18, 2008   (DE) .......................... 10 2008 038 197

(51) Int. Cl.
*B60K 17/04* (2006.01)
*F16H 41/24* (2006.01)

(52) U.S. Cl. ................................ 60/367; 60/364; 60/366
(58) Field of Classification Search .................... 60/364, 60/366, 367
See application file for complete search history.

(56) References Cited

U.S. PATENT DOCUMENTS

| 3,027,720 | A | * | 4/1962 | Tuck et al. | 60/362 |
| 3,901,030 | A | * | 8/1975 | Wonn | 60/364 |
| 3,965,680 | A | * | 6/1976 | Cottrell et al. | 60/367 |
| 6,026,941 | A |   | 2/2000 | Maienschein et al. | |

FOREIGN PATENT DOCUMENTS

| DE | 4122135 | 1/1993 |
| DE | 19822665 | 12/1998 |
| DE | 102006042441 | 3/2008 |

* cited by examiner

*Primary Examiner* — Thomas E Lazo
(74) *Attorney, Agent, or Firm* — Simpson & Simpson, PLLC

(57) ABSTRACT

A drive train, including a hydrodynamic torque converter with a housing arranged to be rotationally driven by a drive unit for a motor vehicle and an output part. The drive train includes an input shaft for a transmission. The output part is non-rotatably connected to the input shaft. An internal circumference of the transmission input shaft is supported by the housing.

13 Claims, 3 Drawing Sheets

DRIVE TRAIN COMPRISING A HYDRODYNAMIC TORQUE CONVERTER, AND HYDRODYNAMIC TORQUE CONVERTER

CROSS-REFERENCE TO RELATED APPLICATIONS

This application is filed under 35 U.S.C. §120 and §365(c) as a continuation of International Patent Application PCT/DE2009/001135, filed Aug. 6, 2009, which application claims priority from German Patent Application No. 10 2008 038 197.7, filed Aug. 18, 2008, which applications are incorporated herein by reference in their entireties.

FIELD OF THE INVENTION

The invention relates to a drive train in a motor vehicle with a hydrodynamic torque converter disposed between a drive unit with a drive shaft and transmission with a transmission input shaft.

BACKGROUND OF THE INVENTION

Drive trains in motor vehicles with automatic transmissions and hydrodynamic torque converters effective as fluid clutches are known. As a rule, the torque converter is received on a transmission stub. Furthermore, from German Patent Application No. 10 2006 042 441 A1, it is well known that the bearing of the transmission input shaft is mounted by means of a hub fixed on the housing disposed on the outside circumference of the transmission input shaft. The German Patent No. 198 22 665 A1 discloses a pilot bearing for the transmission input shaft, with which the outside circumference of the transmission input shaft is supported in a pilot bushing of the housing. Such bearings of the transmission input shaft on the outside circumference require additional space and are costly when hubs are used.

BRIEF SUMMARY OF THE INVENTION

The present invention broadly comprises a drive train in a motor vehicle with a hydrodynamic torque converter disposed between a drive unit with a drive shaft and transmission with transmission input shaft. The housing of the hydrodynamic torque converter is rotationally driven by the drive unit and is connected non-rotatably to an output part of the hydrodynamic torque converter with the transmission input shaft. The housing is supported on an internal diameter of the transmission input shaft with respect to the transmission input shaft. Through the support or mounting of the transmission input shaft on an axial extension, which interlocks axially in the recess of the transmission input shaft, a cost-effective solution can be proposed, which does not require additional radial space, and is therefore neutral as far as space is concerned, so that the space in the section that axially overlaps the transmission input shaft in the internal circumference and on the outside circumference of the transmission input shaft can be used for accommodating further components of the torque converter, such as hubs for mounting the lockup clutches, turbines, components of torsional vibration dampers disposed in the internal space of the housing, or in combinations thereof. Furthermore, an outside profile, such as splines for the driven hubs and the like can be provided on this section, so that also axial space can be won.

In the present invention, an internal combustion engine or a hybrid drive with a connected electric motor constitutes a drive unit. The transmission can be an automated transmission with discrete gearshift stages, a continuously adjustable transmission such as chain CVT, or toroidal drive or the like.

The hydrodynamic torque converter can be a two-channel or multi-channel torque converter with an integrated lock-up clutch and a single stage or multi-stage torsional vibration damper, a centrifugal force pendulum, or in combinations thereof. A torsional vibration damping can take place between the closed or slipping lock-up clutch and the transmission input shaft, between the turbine and the transmission input shaft, or in combinations thereof. The torque converter can be executed as a pure fluid clutch with an impeller driving the turbine and in turn driven by the housing. Alternatively, a stator made of casting or plate, connected with the housing of the transmission by means of a one-way clutch, can be provided. Furthermore, the torque converter can be formed as a so-called multi-function converter, with which, by means of additional clutches, the drive unit can be uncoupled from the torque converter, the transmission can be uncoupled from the torque converter, or in combinations thereof. An electric motor can be connected in parallel with the housing of the torque converter. For example, the housing can be connected with a rotor of an electric motor.

In one embodiment, an axial extension can be provided on the housing of the torque converter, which interlocks axially in a recess provided at the face side of the transmission input shaft or in an opening, which, for example, can be drilled. If cylindrical in form, this opening rotatably accommodates the axial extension, such as a journal. For this purpose, a bearing, i.e., a plain bearing or a needle bearing, system with a needle bearing can be provided radially between the axial extension and the cylindrical recess. Thus, a plain bearing or needle bearing can be mounted or pressed before assembly, e.g., the extension and recess can be plugged into each other during assembly of the torque converter on the transmission, on the extension, or on the internal circumference of the transmission input shaft.

In a boring of the transmission input shaft for the supply of converter fluid, e.g., for the control of the lock-up clutch, for the torque converter with converter fluid, or in combinations thereof, a seal can be provided on the transmission input shaft against the axial extension, according to the type of lock-up clutch control and bearing of the supply openings. To do this, a radially sealing ring can be provided on the axial extension, which, e.g., seals against the plain bearing disposed radially outside, which again seals against the internal circumference of the transmission input shaft. Other embodiments can provide dynamic seals such as radial shaft sealing rings or the like, which directly seal the axial extension against the internal circumference of the transmission input shaft. Thus, a bearing, i.e., a roller bearing such as needle bearing can be disposed, and thus, be effectively greased within the seal towards the boring, so that separate lubrication of the roller bearing can be omitted.

An alternative seal of the axial extension against the transmission input shaft could occur independently of the shaft, in that a sealing ball is introduced axially inside the transmission input shaft, at a distance from the extension. This can be pressed through the boring made with a smaller diameter, against a step formed from the face side of the recess on the transmission input shaft. Thus, the sealing ball can form a radial sealing surface, axial sealing surface, or in combinations thereof, with the transmission input shaft.

In another embodiment, the axial extension can be solid, e.g., a journal. Such an extension is centered to the axis of rotation and welded with the housing.

Outside its housing, the torque converter includes an extension centered axially on the axis of rotation of the torque converter, which interlocks in an opening of the drive shaft, such as crankshaft of the drive unit, and forms a pilot bearing of the torque converter in the drive shaft. Corresponding pivot bearings between the extension and opening can be formed as plain bearing or roller bearing and the pilot bearing if formed such that an axial offset, an axial swivel, or in combinations thereof, between the axis of rotation of the torque converter and the drive shaft can be equalized. Both axial extensions for the formation of the pilot bearing and for bearing the transmission input shaft on the housing are formed as one piece. To do this, they can be provided as a common journal or as a cylindrical solid component that is mounted in a central opening of the housing and is welded with the housing in a sealed manner.

In yet another embodiment, the axial extension can be produced out of sheet metal, e.g., it can be stamped by means of a sheet-metal forming process. Thus, a radially extending flange or arms can be provided, by means of which the extension is firmly connected to the housing. For example, a flange or arms can be riveted to the housing by means of leakage tight riveting, e.g., exposed rivet studs. Alternatively, the extension can be caulked to the housing. To do this, the extension can be placed on an axial extension and be caulked against the extension. It is understandable that other fastening possibilities, e.g., of sheet-metal extension on the housing, are included in the inventive concept.

In the present invention, a hydrodynamic torque converter as a separate component for a drive train as described above includes a housing and an axial extension disposed within the housing around an axis of rotation of the housing for axial interlock in a face opening of the transmission input shaft downstream of the hydrodynamic torque converter. The above-described axial extension embodiments are also applicable to a torque converter that is independent of the entire drive train.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention.

While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs.

Figure 1:
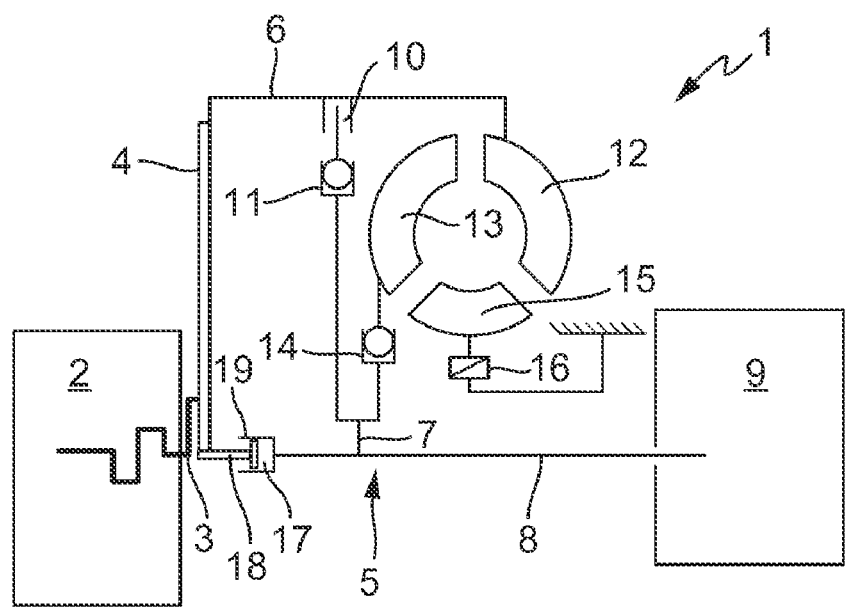
FIG. 1 is a schematic illustration of a drive train with a hydrodynamic torque converter.

Adverting now to the figures, FIG. 1 is a schematic view of drive train 1 with drive unit 2, e.g., an internal combustion engine, with drive shaft 3 like a crankshaft that is connected non-rotatably by means of a drive plate such as flex plate 4 with housing 6 of hydrodynamic torque converter 5. Output part 7, e.g., a power take-off hub, is connected non-rotatably with transmission input shaft 8 of transmission 9. Automatic transmission 9 includes transmission ratios adjustable by a control unit. The induced torque is converted by the torque converter from the transmission input shaft to the transmission output shaft (not represented) into rotation speed and subsequently transmitted further onto the drive wheels.

Torque converter 5 is driven via its housing 6 from drive unit 2. Through lock-up clutch 10, the torque induced into housing 6 in the case of a closed lock-up clutch is transmitted via interposed torsional vibration damper 11 directly over output part 7 into transmission input shaft 8, and in the case of opened lock-up clutch 10, it is transmitted onto impeller 12 that drives turbine 13. From the turbine, the torque is induced via interposed turbine damper 14 over output part 7 into transmission input shaft 8. Stator 15 disposed fixedly in one rotation direction on housing 6 by means of one-way clutch 16 serves for torque increase in case of large differential rotation speeds between impeller 12 and turbine 13.

Torque converter 5 is mounted on the housing of transmission 9. Transmission input shaft 8 is supported on housing 6 of torque converter 5. In order to save space, transmission input shaft 8 includes recess 17, in which axial extension 18 fixed on housing 6 interlocks axially. Bearing 19 is disposed between the internal circumference of recess 17 and extension 18.

Figure 2:
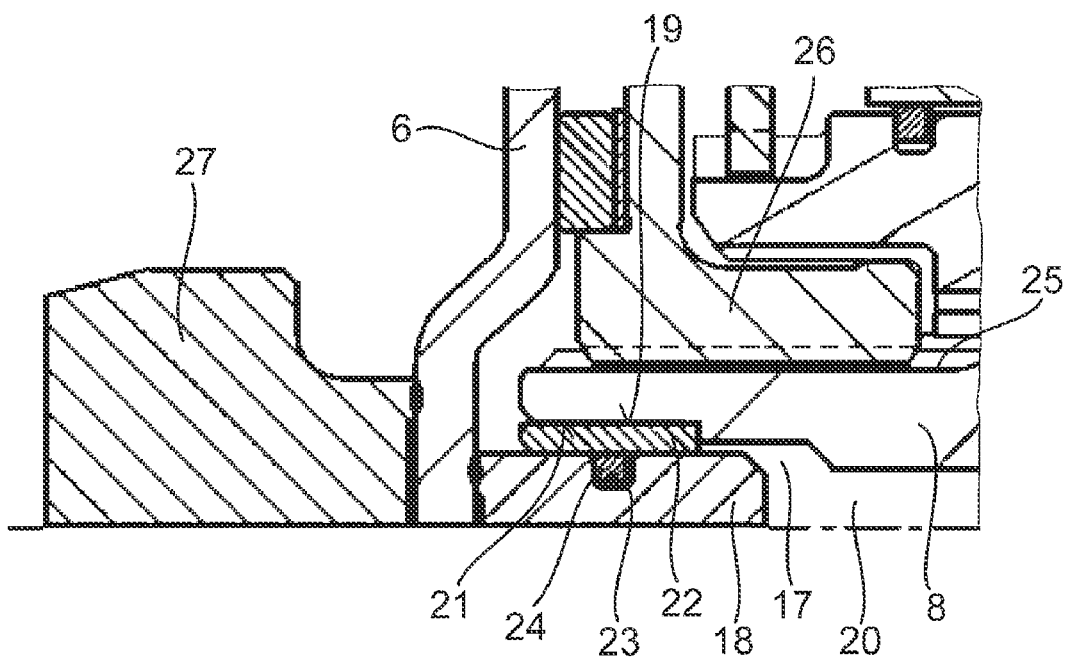
FIG. 2 is a partial, cross-sectional view of the drive train shown in FIG. 1, illustrating a section with a bearing of a transmission input shaft on a housing by means of an axial extension interlocked in the transmission input shaft.

FIG. 2 is a partial, cross-sectional view of drive train 1 shown in FIG. 1, illustrating a bearing of transmission input shaft 8 on housing 6 of torque converter 5. The following should be viewed in light of FIGS. 1 and 2. Transmission input shaft 8 includes boring 20, through which converter fluid is pressed from the transmission into the torque converter or flows out of the torque converter. Boring 20 is expanded on the face end of transmission input shaft 8 radially to recess 17, in which axial extension 18 is axially received in the form of a journal. Axial extension 18 is welded with housing 6, and it supports transmission input shaft 8 radially and rotatably on internal circumference 21. Bearing 19 is provided in the form of plain bearing 22, which is received on internal circumference 21 of transmission input shaft 8 and in which axial extension 18 is introduced in an assembly of the torque converter by attaching it to that of transmission 9. Axial extension 18 includes ring groove 23, in which sealing ring 24 is inserted, which seals radially against plain bearing 22 and prevents converter fluid from streaming out.

Radially outside, splines 25 are provided on the outside circumference of transmission input shaft 8, in which power take-off hub 26 designed as output part 7 of torque converter 5 non-rotatably interlocks. Through the support of transmission input shaft 8 on internal circumference 21, the radial space can be used for power take-off hub 26. Furthermore, through axial overlap of bearing 19 and splines 25 of transmission input shaft 8, axial space can be saved.

Outside housing 6, journal 27 forms a pilot bearing with drive shaft 3.

Figure 3:
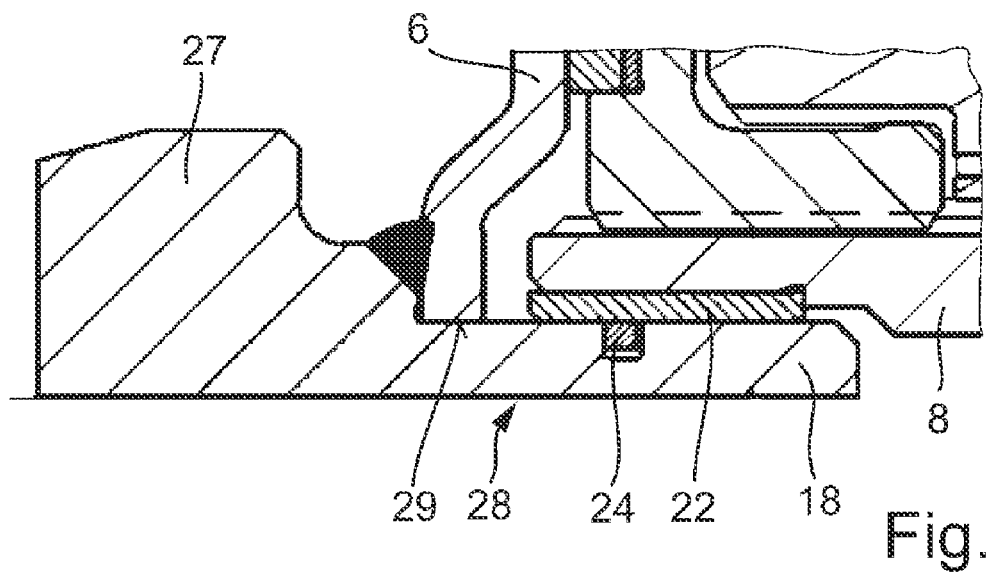
FIG. 3 is a partial, cross-sectional view showing the bearing of FIG. 2 with a one-piece journal for a pilot bearing of the transmission input shaft on the housing and a pilot bearing of the housing on a drive shaft of a drive unit.

FIG. 3 is a partial, cross-sectional view showing a bearing of transmission input shaft 8 on housing 6. Journal 27 is executed with extension 18 by forming cylindrical component 28. Cylindrical component 28 can be made by machined rod material, forged, sintered by means of a dimension-conversion process also out of sheet metal, or the like. In housing 6, central opening 29 is provided for receiving cylindrical component 28, through which cylindrical component 28 will be fitted, centered and subsequently sealed by welding. Plain bearing 22 and sealing ring 24 are disposed according to FIG. 2.

Figure 4:
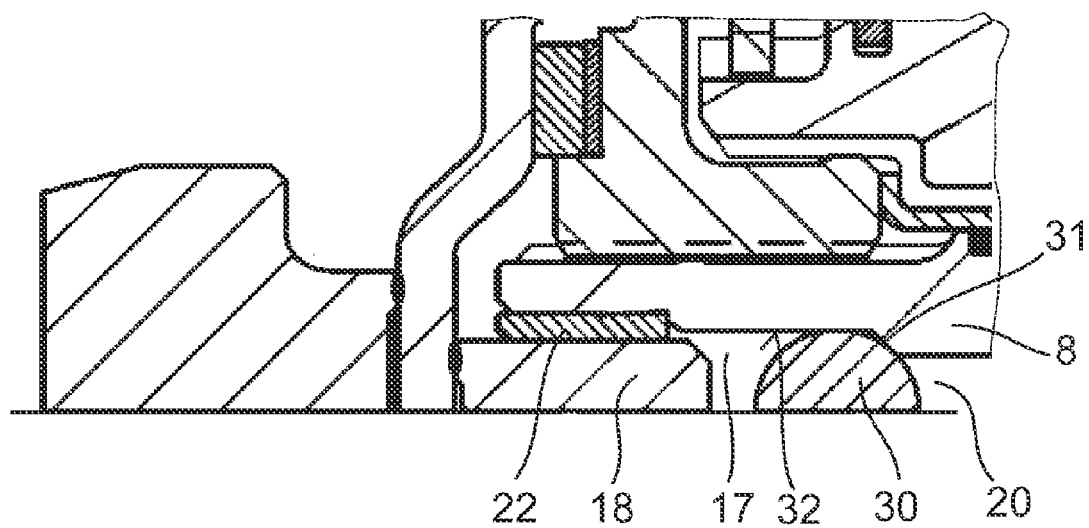
FIG. 4 is a partial, cross-sectional view depicting a seal of the transmission input shaft in contrast to that of FIG. 2.

FIG. 4 is a partial, cross-sectional view depicting a seal for boring 20 of transmission input shaft 8 that is modified in comparison with that in FIG. 2. The following should be viewed in light of FIGS. 1, 2, and 4. Ring groove 23 in axial extension 18 is omitted and sealing ball 30 is pressed against stop 31 formed by stepped boring 20. Sealing ball 30 seals on internal circumference 32 of recess 17, but can alternatively or additionally seal at stop 31. Plain bearing 22 is disposed according to FIG. 3.

Figure 5:
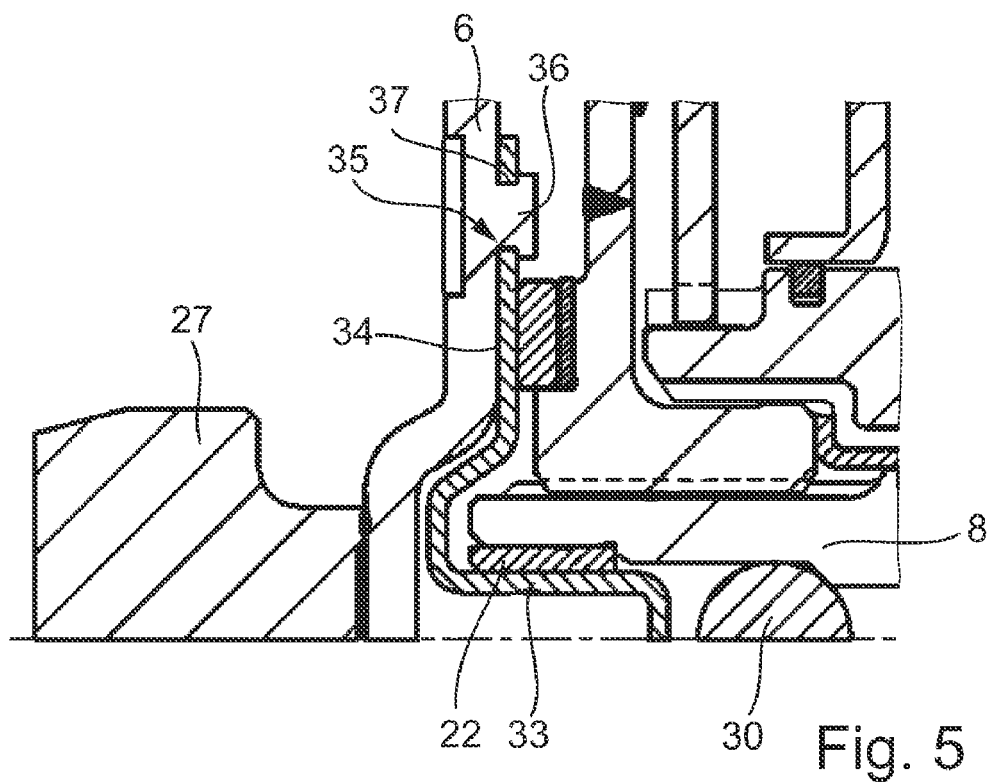
FIG. 5 is a partial, cross-sectional view illustrating an axial extension of sheet metal in contrast to that of FIG. 2; and, FIG. 6 is a partial, cross-sectional view showing a fastening of an axial extension on the housing of FIG. 5.

FIG. 5 is a partial, cross-sectional view illustrating axial extension 33 made of sheet metal. The following should be viewed in light of FIGS. 1, 2, and 5. Axial extension 33 can be made of one-piece or several pieces of stamped or deep-drawn sheet metal. Radially extending flange 34 is guided and positioned along housing 6. Fastening is provided by means of riveting 35, which is formed by rivet stud 36 pressed out of housing 6, which is guided though openings 37 in flange 34 and is riveted against flange 34. The arrangement of journal 27 occurs according to FIG. 2. Transmission input shaft 8 corresponds to transmission input shaft 8 of FIG. 4, such that sealing ball 30 is received accordingly. Plain bearing 22 corresponds to that of FIG. 4.

Figure 6:
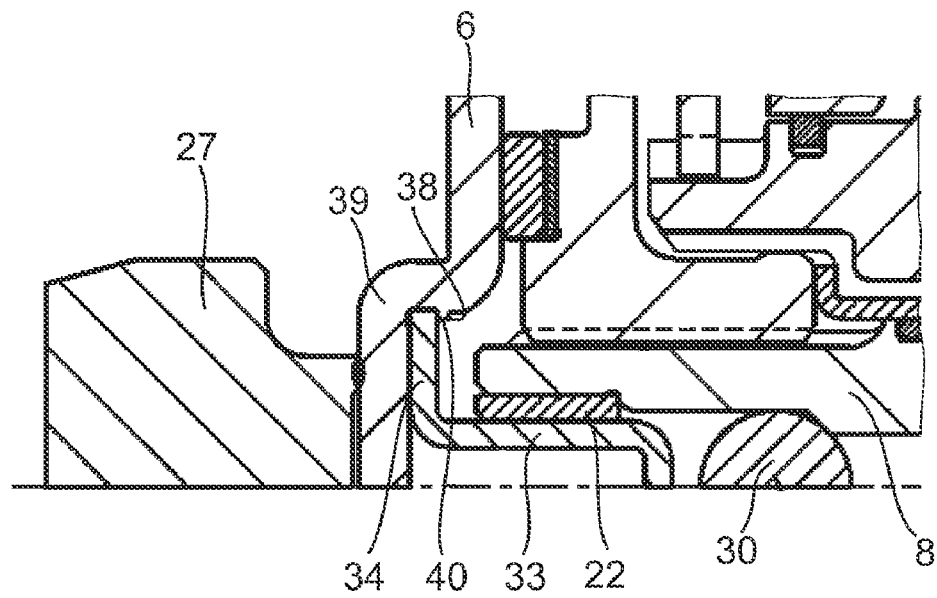

FIG. 6 is a partial, cross-sectional view showing an alternative fastening of axial extension 33 in the form of caulking Flange 34 is placed on formation 39 of housing 6 and is secured axially by means of caulked nose 40. Journal 27, plain bearing 22 and sealing ball 30 correspond to those of FIG. 5.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE SYMBOLS 1 drive train
2 drive unit
3 drive shaft
4 flex plate
5 torque converter
6 housing
7 output part
8 transmission input shaft
9 transmission
10 lock-up clutch
11 torsional vibration damper
12 impeller
13 turbine
14 turbine damper
15 stator
16 one-way clutch
17 recess
18 axial extension
19 bearing
20 boring
21 internal circumference
22 plain bearing
23 ring groove
24 sealing ring
25 splines
26 power take-off hub
27 journal
28 cylindrical component
29 opening
30 sealing ball
31 stop
32 internal circumference
33 axial extension
34 flange
35 riveting
36 rivet stud
37 opening
38 caulking
39 formation
40 caulked nose

What is claimed is:

1. A drive train, comprising:
a hydrodynamic torque converter including:
a housing arranged to be rotationally driven by a drive unit for a motor vehicle; and,
an output part; and,
an input shaft for a transmission, wherein:
the output part is non-rotatably connected to the input shaft;
an internal circumference of the transmission input shaft is supported by the housing;
an axial extension provided on the housing interlocks in a cylindrical recess introduced on a face of the transmission input shaft towards the axial extension; and,
the axial extension is stamped out of sheet metal and is connected rigidly with the housing by means of a radially extending flange.

2. The drive train of claim 1, wherein a bearing is provided radially between the axial extension and the cylindrical recess.

3. The drive train of claim 2, wherein the bearing is a plain bearing or a needle bearing.

4. The drive train of claim 2, wherein the bearing is pressed on the axial extension or in the internal circumference of the transmission input shaft before the assembly of the axial extension and the transmission input shaft.

5. The drive train of claim 1, wherein a boring of the transmission input shaft is sealed against the axial extension.

6. The drive train of claim 5, wherein a radial sealing ring is provided in the axial extension.

7. The drive train of claim 5, wherein a sealing ball is fitted, inside the transmission input shaft, axially at a distance from the axial extension.

8. The drive train of claim 1, wherein the axial extension is solid material.

9. The drive train of claim 1, wherein the axial extension is welded with the housing.

10. The drive train of claim 1, wherein the axial extension in the form of single-piece cylindrical component with a journal protruding from the housing is made to form a pilot bearing with the drive shaft.

11. The drive train of claim 10, wherein the cylindrical component is guided through a central opening of the housing and sealed by welding with the housing.

12. The drive train of claim 1, wherein the flange is riveted with the housing or is connected rigidly by means of caulking with the housing.

13. A drive train, comprising:
a hydrodynamic torque converter including:
  a housing arranged to be rotationally driven by a drive unit for a motor vehicle; and,
  an output part; and,
an input shaft for a transmission, wherein:
  the output part is non-rotatably connected to the input shaft;
  an internal circumference of the transmission input shaft is supported by the housing;
  an axial extension provided on the housing interlocks in a cylindrical recess introduced on a face of the transmission input shaft towards the axial extension; and,
  a boring of the transmission input shaft is sealed against the axial extension.

* * * * *